May 8, 1962 C. H. LEE 3,033,602
NARROW PILLAR VEHICLE DOOR LATCH
Filed April 27, 1960 2 Sheets-Sheet 1

INVENTOR.
Charles H. Lee
BY
W. S. Pettigrew
ATTORNEY

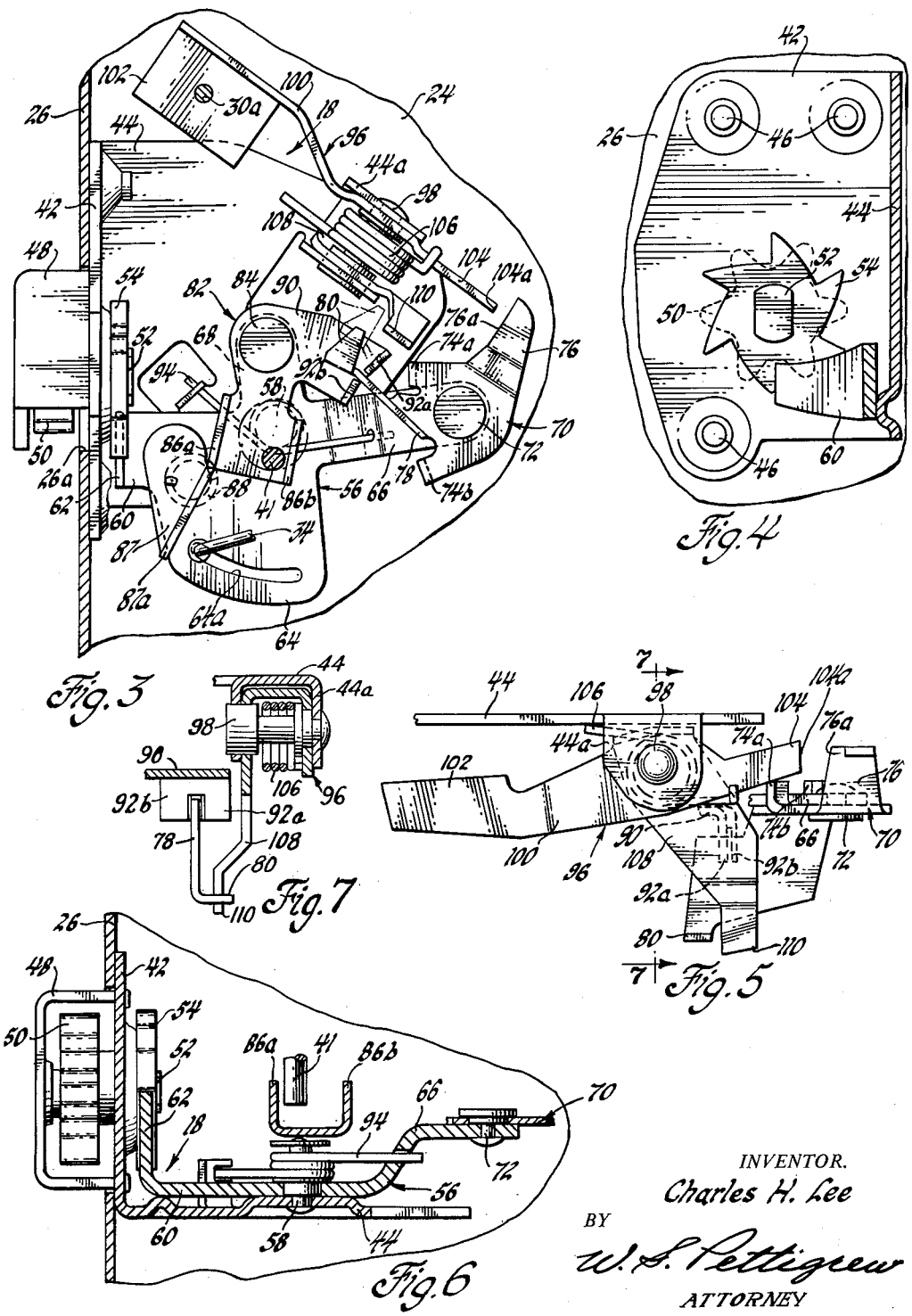

3,033,602
NARROW PILLAR VEHICLE DOOR LATCH
Charles H. Lee, Taylor, Mich., assignor to General Motors Corporation, Detroit, Mich., a corporation of Delaware
Filed Apr. 27, 1960, Ser. No. 25,126
8 Claims. (Cl. 292—280)

This invention relates to a door latch, and more particularly to a door latch especially adapted for use in vehicles having narrow body pillars.

One feature of the invention is that it provides an improved door latch.

Another feature of the invention is that it provides a door latch particularly adapted for use in a vehicle having narrow body pillars.

A further feature of the invention is that it provides a door latch for an automobile having latching means comprising a rotatable bolt mounted adjacent the outer surface of the frame body and a ratchet member mounted on the inner surface of the frame body portion which lies parallel to the jamb face of the door, the ratchet comprising the only operating member of the latch which is mounted on the inner surface of this portion of the frame.

Still another feature of the invention is that it provides a vehicle door latch construction including a rotatable bolt, a detent for blocking rotation of the bolt in one direction, outside actuating means for operating the detent and an intermittent link which is mounted on the detent for movement between an unlocked position where it couples the outside actuating means to the detent and a locked position where it is uncoupled from the outside actuating means.

Still a further feature of the invention is that the latch includes a locking lever which is pivotally mounted on the detent and which is connected to the intermittent link for shifting the intermittent link between locked and unlocked positions.

Other features and advantages of the invention will be apparent from the following description and from the drawings, in which:

FIGURE 3 is a reduced view of the latch of FIGURE 1 with the parts in locked position, a portion of the intermittent link being shown in broken lines in unlocked position;

FIGURE 4 is a reduced section taken along the line 4—4 of FIGURE 2;

FIGURE 5 is a reduced section taken along the line 5—5 of FIGURE 2;

FIGURE 6 is a reduced section taken along the line 6—6 of FIGURE 2, and

FIGURE 7 is a section taken along the line 7—7 of FIGURE 5.

Figure 1:
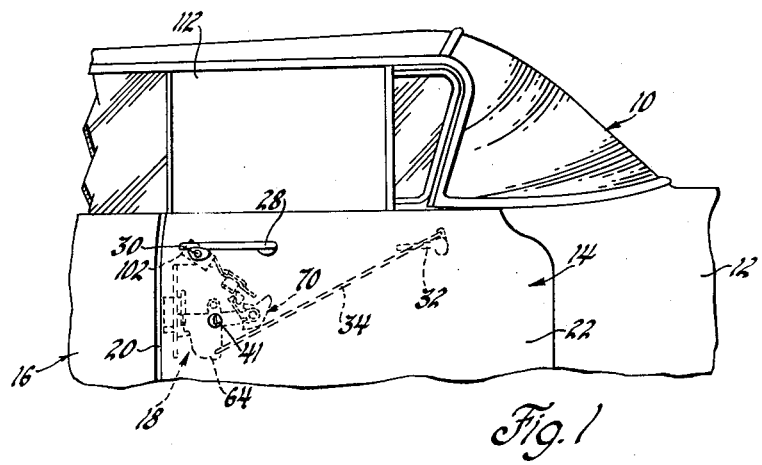
FIGURE 1 is a fragmentary side elevational view of an automobile having the improved door latch mounted in the front door, parts which underlie the door outer panel being shown in broken lines.

Referring now more particularly to the drawings, FIGURE 1 shows an automobile designated generally by the reference character 10 and having a body 12 provided with a front door designated generally as 14, and a rear door designated generally as 16. The front door 14 is hingedly mounted in conventional manner (not shown) at its front edge on the automobile body 12, and near its rear edge the door 14 mounts a latch designated generally as 18 and having a bolt adapted to engage a striker which is fixedly mounted on a narrow center body pillar 20. The particular configuration of the striker forms no part of this invention and a suitable striker and its means of engaging a latch bolt of this type are shown and described in the patents to Cockburn et al. 2,871,049 and Van Voorhees 2,835,526, to which reference may be had if desired. The rear door 16 of the automobile, which is shown only fragmentarily in FIGURE 1, is hingedly mounted in conventional manner (not shown) on the center body pillar 20.

The front door includes a door outer panel 22 and a door inner panel 24 which are joined together at their rear edges by a jamb face portion 26. For operating the door latch from outside the automobile there is a gripping handle 28 which is fixedly mounted on the door outer panel and which carries a slidable push button assembly 30. The latch may be operated from inside the door by means of a remotely located turn handle 32 which is mounted on the door inner panel 24 and is connected to the latch by a remote connecting rod 34. The door may be locked from inside the automobile by turning the handle 32 in the direction opposite to the direction it was turned to open the door. The door may be locked from outside the car through a conventional key cylinder device 41 mounted in the door outer panel and arranged to operate the locking lever in the door latch.

The latch 18, which is shown in detail in FIGURES 2–6, comprises a frame having a body portion 42 lying parallel to the jamb face 26 of the door and a right angular flange portion 44 lying parallel to the inner panel 24 of the door. The body of the frame is secured to the jamb face of the door by a plurality of bolts 46.

The jamb face 26 of the door is formed with an opening 26a through which a bolt housing portion 48 of the latch frame projects, and a rotary gear type bolt 50, which forms part of the latching means, is located in the housing 48, being rigidly mounted on a bolt shaft 52 which is rotatably journaled between the outer face of the bolt housing 48 and the latching frame body 42. The latching means also includes a toothed ratchet member 54 which is rigidly mounted on the bolt shaft 52 on the inner surface of the frame body 42. Since both the bolt 50 and the ratchet 54 are rigidly mounted on the bolt shaft 52, the bolt and ratchet are effectively an integral unit and rotate together. It may be noted from FIGURE 4 that the ratchet 54 is the only operating part of the latch which is mounted on the frame body 42.

Figure 2:
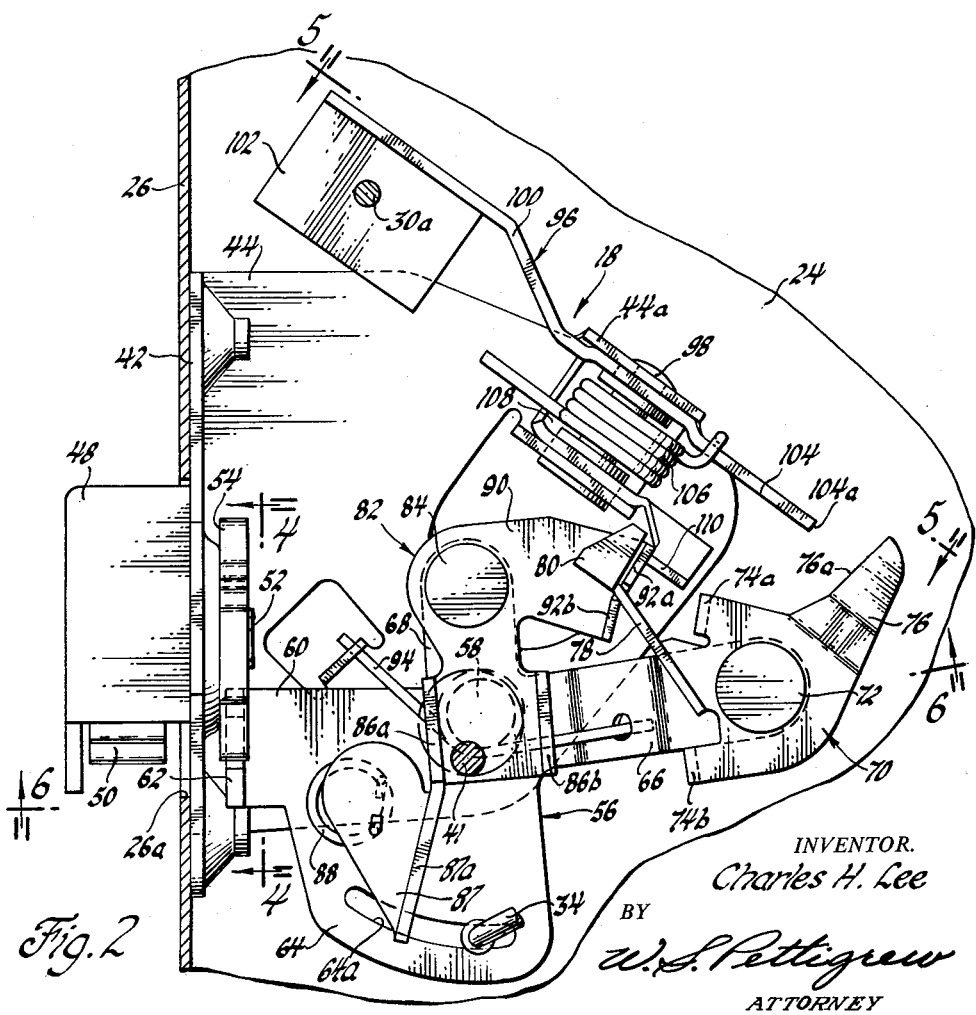
FIGURE 2 is an enlarged view of the latch shown in FIGURE 1 with the door outer panel removed, the latch parts being in unlocked position.

In order to hold the latching means against rotation in a door-opening direction there is a detent which is designated generally by the reference character 56 and which is pivotally mounted on the flange portion 44 of the latch frame on a stud 58. As shown in FIGURES 2 and 3, the detent comprises a plurality of arms, one of which is designated as 60 and which extends rearwardly from the pivot stud 58 and terminates in a right angularly bent foot 62 which, as shown best in FIGURE 4, is adapted to engage the ratchet 54 and prevent rotation of the latching means in one direction. Another arm 64 extends downwardly from the pivot stud 58 and is connected to the remote connecting rod 34, which extends through a slot 64a in the detent arm 64. A third arm 66 extends forwardly from the stud 58 and a fourth arm 68 extends upwardly from the stud 58.

An intermittent link 70 is pivotally mounted on a stud 72 which projects from the forwardly extending detent arm 66. The intermittent link is formed with a pair of stop tabs 74a and 74b which respectively engage the upper and lower edges of the detent arm 66 to limit pivotal shifting movement of the intermittent link relative to the detent between the unlocked position of FIGURE 2 and the locked position of FIGURE 3. An arm 76 of the intermittent link extends forwardly and upwardly from the mounting stud 72 for a purpose later to be described. A coupling arm 78 of the intermittent link extends upwardly and rearwardly from the pivot stud 72 and terminates in an upwardly projecting coupling tab 80.

The upwardly extending arm 68 of the detent pivotally mounts a locking lever 82 by means of a stud 84 which projects from the detent arm 68. The locking lever has a pair of ears 86a and 86b between which is received a conventional locking pawl extending from the key cylinder 41 for flipping the locking arm between the unlocked position of FIGURE 2 and the locked position of FIGURE 3 through the agency of a conventional automobile key, and an inside locking arm 87 of the locking lever extends downwardly from the pivot stud 84 and is formed with a right angular actuating flange 87a. An overcenter spring 88 yieldably holds the locking lever either in locked or unlocked position. A connecting arm 90 of the locking lever is formed with spaced, bent tabs 92a and 92b which straddle the coupling arm 78 of the intermittent link 70 so that when the locking lever 82 is swung between its unlocked and locked positions it carries with it the intermittent link 70. A spring 94 is coiled around the detent stud 58 and has one end hooked to a tab turned from the latch frame and the other end projecting through an opening in the detent arm 66 so that the spring 94 yieldably urges the detent in a clockwise direction as the parts appear in FIGURES 2 and 3 to bring the detent foot 62 into engagement with the ratchet 54.

Outside actuating means comprises a push button lever designated generally as 96 pivotally supported on a stud 98 projecting from a mounting flange 44a which projects from and forms part of the flange portion 44 of the latch frame. The push button lever 96 has three arms, one of which is identified by the reference character 100. This arm, which forms the operating arm of the push button lever, has at its end a right angular flange 102 which lies adjacent the end of and in the path of movement of the shaft 30a of the outside push button asembly 30. Another arm 104 of the push button lever extends in a direction generally opposite to the direction of extent of the operating arm 100 and terminates in an abutment surface 104a adjacent the forwardly projecting arm 76 of the intermittent link. A spring 106 which is coiled about the push button lever mounting stud 98 has one end bearing against the flange 44 and the other end hooked over the arm 104 of the push button lever to bias the push button lever so that its operating flange 102 normally lies closely adjacent the end of the outside push button shaft 30a. A third or coupling arm 108 projects from the push button lever out of the plane of the arms 100 and 104 and then is bent back parallel to the plane of the arms 100 and 104. The mounting stud 98 passes through an opening in this arm so that the arm 104 forms a support bearing for the push button lever. At its free end the arm 108 has a coupling tab 110 which underlies the complementary coupling tab 80 of the intermittent link.

The operation of an improved door latch will be described below. With the latch parts in the position shown in FIGURE 2, the door is unlocked. Assuming the door to be closed, as shown in FIGURE 1, the detent foot 62 engages a tooth of the ratchet 54 and blocks the latching means comprising the bolt 50 and the ratchet 54 against rotation in a door opening direction. Since the bolt teeth engage complementary teeth on a body-mounted striker, as shown in Patents Nos. 2,871,049 and 2,835,526, the door is held latched. In order to open the door from the outside, the push button 30 is depressed and its shaft 30a engages the operating flange 102 on the push button lever and swings the push button lever in a clockwise direction (FIGURE 5) so that its coupling tab 110 picks up the complementary coupling tab 80 on the intermittent link 70, causing the intermittent link to tend to swing in a clockwise direction (FIGURES 2 and 3), the tab 74b picking up the detent arm 66 and swinging the detent foot 62 out of holding engagement with the ratchet 54. Since the bolt 50 and the ratchet 54 now are freely rotatable, the door may be pulled open by means of the gripping handle 28.

In order to open the door from the inside, the remote handle 32 is turned, pulling on the rod 34 which is connected directly to the detent 56. This swings the detent foot 62 out of holding engagement with the ratchet.

The door may be locked from the inside by turning the handle 32 to push on the rod 34 so that it moves to the left in the slot 64a from the unlocked position of FIGURE 2 to the locked position of FIGURE 3. During this movement, the rod 34 picks up the tab 87a on the locking lever and swings the locking lever a sufficient distance toward locked position so that the over-center spring exerts a force to complete movement of the locking lever to the locked position of FIGURE 3 where the coupling tab 80 of the detent is out of the path of swinging movement of the coupling tab 110 of the push button lever so that upon actuation of the outside push button 30, the push button lever 96 merely "free wheels." Even though locked against outside operation, the door may be opened from the inside since the connecting rod 34 is connected directly between the remote handle 32 and the detent 56. Opening the door from the inside when the latch parts are in locked position swings the parts back to unlocked position in a manner later to be described. Locking from the outside is accomplished by shifting the locking lever 82 from the unlocked position shown in FIGURE 2 to the locked position shown in FIGURE 3 by means of a conventional key cylinder device having an actuating pawl which is received between the locking lever ears 86a and 86b and which, when the key is turned, shifts the locking lever.

The latch includes the features of remote and automatic undogging and keyless locking. Remote undogging means that when the latch parts are in locked position and the door is opened from inside the automobile, the latch parts are shifted to unlocked position. Automatic undogging means that when the latch parts are in locked position while the door is open and the door is slammed shut, the parts are shifted to unlocked position. However, if desired, the operator may by a conscious act avoid automatic undogging and accomplish keyless locking.

The arm 104 of the push button lever terminates in an undogging abutment surface 104a and the arm 76 of the intermittent link has a complementary undogging abutment surface 76a which, when the parts are in locked position as shown in FIGURE 3, lies closely adjacent the abutment surface 104a. If the remote handle is turned to swing the detent in a counterclockwise direction as shown in FIGURE 3, the abutment surface 76a of the intermittent link will move into engagement with the abutment surface 104a of the push button and upon continued movement of the detent, the intermittent link will be swung relative to the detent from the locked position of FIGURE 3 to the unlocked position of FIGURE 2. A similar automatic undogging operation occurs if the door is closed while the parts are in locked position. Since the teeth of the bolt 50 engage the teeth of the striker which is mounted on the body, the bolt 50 and ratchet 54 will turn as the door closes, camming the detent foot 60 over the sloping back side of the ratchet teeth. This camming movement of the detent swings the undogging abutment 76a into engagement with the undogging abutment 104a and the intermittent link is moved back to unlocked position. However, keyless locking may be accomplished while the door is being closed merely by pushing in on the outside push button 30. This swings the push button lever in a clockwise direction in FIGURE 5 so that the abutment surface 104a is out of the path of movement of the undogging abutment 76a on the intermittent link.

An important feature of the latch construction described and claimed herein is that it provides a latch which is particularly adapted for use in an automobile having a narrow body pillar, such as is illustrated at 20 in FIGURE 1. The front door of the automobile has a sliding window 112 which moves down in a guide channel into the door past the latch. Inasmuch as the ratchet 54 comprises the only operating member of the latch which is mounted on the inner surface of the flange portion of the frame, there is only one mounting stud 52 which need be avoided in positioning the window guide channel and the channel may be located quite closely adjacent the jamb face 26 of the door. Also it should be noted that the only two operating members which lie in the plane of the jamb face of the door are the ratchet 54 and the detent foot 60 so that the window guide channel may be located quite closely adjacent the jamb face of the door.

While I have shown and described one embodiment of my invention, it is capable of many modifications. Changes, therefore, in the construction and arrangement may be made without departing from the spirit and scope of the invention, as set forth in the appended claims.

I claim:

1. A latch of the character described for a door having inner and outer panels and a jamb face, including: a frame having a body portion lying parallel to the jamb face of the door and a right angular flange portion lying parallel to the inner panel of the door; latching means comprising a rotatable bolt mounted adjacent the outer surface of the frame body portion, a ratchet member mounted on the inner surface of the frame body portion, and means connecting the ratchet rigidly with the bolt to be rotatable therewith; a detent movably mounted on the frame and having a portion engageable with said ratchet for blocking rotation of the latching means in one direction; outside actuating means mounted on the frame for moving said detent portion out of engagement with said ratchet; an intermittent link mounted on said detent for shifting movement between an unlocked position where it couples said outside actuating means to said detent and a locked position where it is uncoupled from said outside actuating means; and a locking lever movably mounted on the detent and connected to the intermittent link for shifting the intermittent link between locked and unlocked positions.

2. A latch of the character described for a door having inner and outer panels and a jamb face, including: a frame having a body portion lying parallel to the jamb face of the door and a right angular flange portion lying parallel to the inner panel of the door; latching means comprising a rotatable bolt mounted adjacent the outer surface of the frame body portion, a ratchet member mounted on the inner surface of the frame body portion, and means connecting the ratchet rigidly with the bolt to be rotatable therewith; a detent pivotally mounted on the frame and having a foot portion engageable with said ratchet for blocking rotation of the latching means in one direction; outside actuating means comprising a push button lever pivotally mounted on the frame for moving said detent foot portion out of engagement with said ratchet; an intermittent link mounted on said detent for shifting movement between an unlocked position where it couples said push button lever to said detent and a locked position where it is uncoupled from said push button lever; a locking lever pivotally mounted on the detent and connected to the intermittent link for shifting the intermittent link between locked and unlocked positions; inside actuating means for moving said detent portion out of engagement with said ratchet; and undogging means on said push button lever and said intermittent link for shifting said intermittent link from locked to unlocked position when the detent is moved.

3. Apparatus of the character claimed in claim 2, wherein said undogging means comprises complementary abutments on the push button lever and the intermittent link, the abutment on the push button lever being swung out of the path of movement of the abutment on the intermittent link when the push button lever is actuated.

4. A latch of the character described for a door having inner and outer panels and a jamb face, including: a frame having a body portion lying parallel to the jamb face of the door and a right angular flange portion lying parallel to the inner panel of the door; latching means comprising a rotatable bolt mounted adjacent the outer surface of the frame body portion, a ratchet member mounted on the inner surface of the frame body portion, and means connecting the ratchet rigidly with the bolt to be rotatable therewith; a detent movably mounted on the flange portion of the frame and having a foot engageable with said ratchet for blocking rotation of the latching means in one direction; outside actuating means mounted on the flange portion of said frame for moving said detent foot out of engagement with said ratchet; and inside actuating means for moving said detent foot out of engagement with said ratchet, said ratchet comprising the only operating member of the latch which is mounted on the inner surface of the flange portion of the frame.

5. A latch of the character described for a door having inner and outer panels and a jamb face, including: a frame having a body portion lying parallel to the jamb face of the door and a right angular flange portion lying parallel to the inner panel of the door; latching means comprising a rotatable bolt mounted adjacent the outer surface of the frame body portion, a ratchet member mounted on the inner surface of the frame body portion, and means connecting the ratchet rigidly with the bolt to be rotatable therewith; a detent pivotally mounted on the flange portion of the frame and having a bent foot portion engageable with said ratchet for blocking rotation of the latching means in a door-opening direction; outside actuating means comprising a push button lever pivotally mounted on the flange portion of said frame for moving said detent foot out of engagement with said ratchet; an intermittent link pivotally mounted on said detent for shifting movement between an unlocked position where it couples said push button lever to said detent and a locked position where it is uncoupled from said push button lever; and inside actuating means for moving said detent foot out of engagement with said ratchet, said ratchet comprising the only operating member of the latch which is mounted on the inner surface of the flange portion of the frame.

6. A latch of the character described for a door having inner and outer panels and a jamb face, including: a frame having a body portion lying parallel to the jamb face of the door and a right angular flange portion lying parallel to the inner panel of the door; latching means comprising a rotatable gear bolt mounted adjacent the outer surface of the frame body portion, a ratchet member mounted on the inner surface of the frame body portion, and means connecting the ratchet rigidly with the bolt to be rotatable therewith; a detent pivotally mounted on the flange portion of the frame and having a bent foot portion engageable with said ratchet for blocking rotation of the latching means in a door-opening direction; outside actuating means comprising a push button lever mounted on the flange portion of said frame for moving said detent foot out of engagement with said ratchet; an intermittent link pivotally mounted on said detent for shifting movement between an unlocked position where it couples said push button lever to said detent and a locked position where it is uncoupled from said push button lever; a locking lever pivotally mounted on the detent and connected to the intermittent link for shifting the intermittent link between locked and unlocked positions; and inside actuating means for moving said detent foot out of engagement with said ratchet, said ratchet comprising the only operating member of the latch which is mounted on the inner surface of the flange portion of the frame.

7. A latch of the character described for a door having inner and outer panels and a jamb face, including: a frame having a body portion lying parallel to the jamb face of the door and a right angular flange portion parallel to the inner panel of the door; latching means comprising a rotatable gear bolt mounted adjacent the outer surface of the frame body portion, a ratchet member mounted on the inner surface of the frame body portion, and means connecting the ratchet rigidly with the bolt to be rotatable therewith; a detent pivotally mounted on the flange portion of the frame and having a foot engageable with said ratchet for blocking rotation of the latching means in one direction; outside actuating means comprising a push button lever pivotally mounted on the flange portion of said frame for moving said detent foot out of engagement with said ratchet; an intermittent link pivotally mounted on said detent for shifting movement between an unlocked position where it couples said push button lever to said detent and a locked position where it is uncoupled from said push button lever; a locking lever pivotally mounted on the detent and connected to the intermittent link for shifting the intermittent link between locked and unlocked positions; inside actuating means for moving said detent foot out of engagement with said ratchet, said ratchet comprising the only operating member of the latch which is mounted on the inner surface of the flange portion of the frame; and undogging means on said push button lever and said intermittent link for shifting said intermittent link from locked to unlocked position when the detent is moved.

8. Apparatus of the character claimed in claim 7, wherein said undogging means comprises complementary abutments on said push button lever and said intermittent link, the abutment on the push button lever being swung out of the path of movement of the abutment on the intermittent link when the push button lever is actuated.

References Cited in the file of this patent
FOREIGN PATENTS
874,258    Germany _____ Apr. 23, 1953